United States Patent
Swerdlow

(10) Patent No.: US 11,838,446 B2
(45) Date of Patent: Dec. 5, 2023

(54) ACTION LIMITATIONS FOR ITEMS OF A SHARED VOICEMAIL INBOX

(71) Applicant: Zoom Video Communications, Inc., San Jose, CA (US)

(72) Inventor: Nick Swerdlow, Santa Clara, CA (US)

(73) Assignee: Zoom Video Communications, Inc., San Jose, CA (US)

(*) Notice: Subject to any disclaimer, the term of this patent is extended or adjusted under 35 U.S.C. 154(b) by 0 days.

(21) Appl. No.: 17/942,802

(22) Filed: Sep. 12, 2022

(65) Prior Publication Data

US 2023/0077835 A1 Mar. 16, 2023

Related U.S. Application Data

(63) Continuation of application No. 17/472,224, filed on Sep. 10, 2021, now Pat. No. 11,477,324.

(51) Int. Cl.
*H04M 3/533* (2006.01)
*H04M 3/42* (2006.01)

(52) U.S. Cl.
CPC ....... *H04M 3/533* (2013.01); *H04M 3/42195* (2013.01)

(58) Field of Classification Search
None
See application file for complete search history.

(56) References Cited

U.S. PATENT DOCUMENTS

| | | | |
|---|---|---|---|
| 9,571,657 B2 | 2/2017 | Sherlock | |
| 2001/0037364 A1* | 11/2001 | Michalek | G06Q 10/10 709/204 |
| 2007/0258576 A1* | 11/2007 | Klein | H04M 3/5234 705/1.1 |
| 2012/0237008 A1* | 9/2012 | Yasrebi | H04L 51/224 379/88.12 |
| 2015/0244866 A1* | 8/2015 | Sherlock | H04M 3/42238 379/88.11 |

OTHER PUBLICATIONS

FluentStream, How to Set Up Voicemail Sentiment Analysis, https://help.fluentcloud.com/helpcenter/s/article/How-to-Set-Up-Voicemail-Sentiment-Analysis-1615636330088, Mar. 14, 2021, 3 pages.
Telzio, Team Voicemail, https://telzio.com/features/call-flow/team-voicemail, Sep. 2021, 6 pages.
LinkedPhone, Virtual Receptionist and Call Menu Options, https://linkedphone.com/virtual-receptionist-and-call-menu-options/, Sep. 2021, 16 pages.

* cited by examiner

*Primary Examiner* — Hemant S Patel
(74) *Attorney, Agent, or Firm* — Young Basile Hanlon & MacFarlane, P.C.

(57) ABSTRACT

A voice message (VM) received from a phone number is associated with a shared VM inbox that is accessible to a group of users. The group of users includes a first user and a second user. The VM is assigned to the first user. The first user is determined not to have responded to the VM within a predefined response time. Responsive to the determination that the first user did not respond to the VM within the predefined response time, the VM is reassigned to the second user; a callback action associated with the VM is enabled for the second user; and the callback action is disabled for the first user. A status associated with the VM is updated based on performance of the callback action.

20 Claims, 7 Drawing Sheets

ACTION LIMITATIONS FOR ITEMS OF A SHARED VOICEMAIL INBOX

BACKGROUND

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them. One type of system which addresses problems such as these includes a unified communications as a service (UCaaS) platform, which includes several communications services integrated over a network, such as the Internet, to deliver a complete communication experience regardless of physical location.

SUMMARY

Disclosed herein are, inter alia, implementations of systems and techniques for callback limitations for shared voicemail (VM) inbox items.

A first aspect is a non-transitory computer readable medium storing instructions operable to cause one or more processors to perform operations that include associating a shared VM received from a telephone number with a shared VM inbox that is accessible to a group of users including a first user and a second user; receiving a request to assign a responsibility for the shared VM to the first user; based on the request, enabling, for the first user and with respect to the shared VM, a callback action usable to initiate a call to the telephone number; and disabling, for the second user and with respect to the shared VM, the callback action; and based on an indication that the first user performed the callback action, updating a status associated with the shared VM.

A second aspect is a method that includes associating a first shared VM received from a first telephone number with a shared VM inbox that is accessible to a group of users including a first user; receiving a request to assign a responsibility for the first shared VM to the first user; updating the first shared VM to indicate that the responsibility for the first shared VM is assigned to the first user; enabling, for the first user and with respect to the first shared VM, a response action usable by the first user to respond to the first shared VM; and updating a status associated with the first shared VM based on an indication that the first user performed the response action.

A third aspect is apparatus that includes a memory and a processor. The processor is configured to execute instructions stored in the memory to associate a first shared VM received from a first telephone number with a shared VM inbox that is accessible to a group of users including a first user; receive a request to assign a responsibility for the first shared VM to the first user; update the first shared VM to indicate that the responsibility for the first shared VM is assigned to the first user; enable, for the first user and with respect to the first shared VM, a response action usable by the first user to respond to the first shared VM; and update a status associated with the first shared VM based on an indication that the first user performed the response action.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
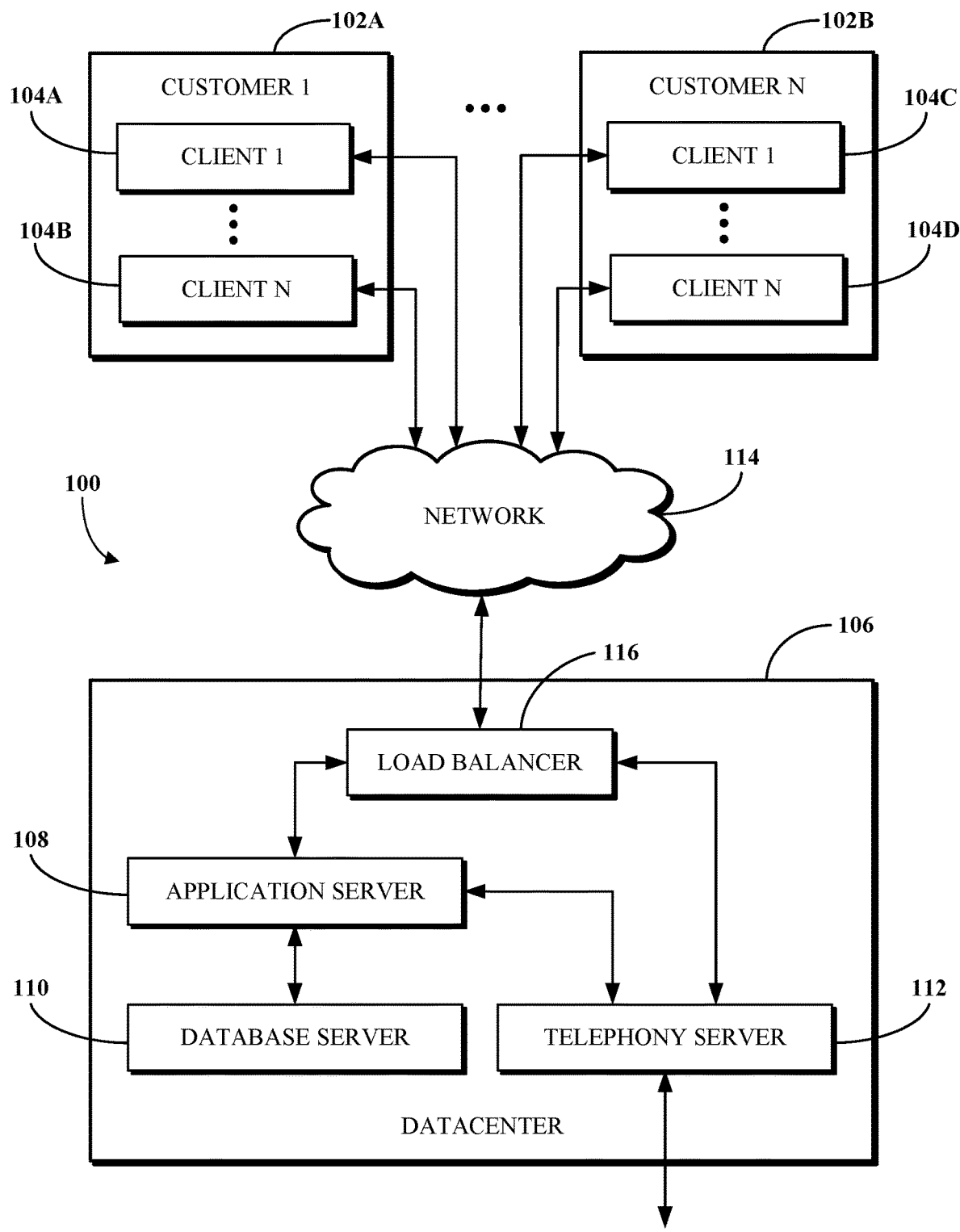
FIG. 1 is a block diagram of an example of an electronic computing and communications system.

A traditional UCaaS platform may include voicemail software whereby a caller (i.e., a person or entity calling someone) may leave a VM in a VM inbox of a callee (i.e., a person being called). The callee may access his/her VM inbox via one or more interfaces or access modalities to, for example, listen to, reply to, or delete a VM left in the VM inbox of the callee. At least one such interface may display a list of the VMs in the VM inbox including respective status indicators, such as whether the callee has already or has not yet listened to a VM or whether the VM is new (e.g., received since the last time the callee accessed the VM inbox).

A VM inbox provided by the VM software may be a shared VM inbox that may be accessible to a group of users. For example, a shared VM inbox may be accessible to all members of an organization or a department. The VM software may provide actions, forms, or interfaces via which a privileged user can set up the shared VM inbox and configure the list of users that can access the shared VM inbox. To gain access to the shared VM inbox, a user of the group of users may provide credential information (e.g., a username and a password) to the UCaaS platform, or, equivalently, to the VM software.

As mentioned above, traditional UCaaS platforms may provide status indicators indicating whether a VM in a VM inbox (such as a shared VM inbox) has or has not been listened to. However, such status indicators, without more, can result in undesirable outcomes. For example, traditional UCaaS platforms do not effectively facilitate the recognition of the full extent of VM statuses, follow up statuses, or the necessity for escalation actions, which presents technical challenges for the users of the group to discern who should take, for example, what action, if any, on which VMs.

To illustrate, and without limitations, when a VM is left in a shared VM inbox of an organization (i.e., a group or team of users within the organization), in a first situation, no user of the group may take ownership of the VM because each user may assume that some other user of the group will or has assumed responsibility for responding to the shared VM. As such, the caller may never receive a response. In a second situation, not knowing that a second user of the group already responded to the shared VM, a first user may also (e.g., redundantly or unnecessarily) respond to the shared VM. Both situations reflect negatively on the group and/or the organization and may result in loss of good will, reputation, customer satisfaction, and other such criteria that may impact the organization.

Furthermore, traditional UCaaS platforms can result in a waste in compute and network resources (collectively, compute resources). For example, redundant responses to a caller can waste compute resources because compute resources are used when phone calls are placed. Additionally, responding to a VM can include using compute resources (e.g., personal compute device, server devices, or networks) to perform investigation and/or background research to determine an optimal response to the VM. Redundantly performing such investigation and/or background research also results in a waste of compute resources.

The ineffective facilitation of the recognition of VM statuses, and the attendant redundant use of compute resources, can degrade performance of the compute resources. The possibility of degraded performance may also include substantially increased investment (such as to compensate for the degradation) in processing, memory, and storage resources and may also result in increased energy expenditures (needed to operate those increased processing, memory, and storage resources, and for the network transmission of the database commands) and associated emissions that may result from the generation of that energy.

Implementations of this disclosure address problems such as these by enabling a user of a group of users (e.g., a team) to obtain (e.g., assume, be assigned, or claim) responsibility of a shared VM of a shared VM inbox. While the UCaaS platform may allow other users of the group to interact with (e.g., listen to or read a transcript of) the shared VM, the UCaaS platform may allow only the responsible user to respond (e.g., place a phone call) to the caller. The UCaaS platform prevents the remaining users of the group from responding to the caller. The term "claiming user," as used herein refers to the user of a group of users who actively claims a shared VM, is automatically assigned to the shared VM, or is assigned responsibility for the shared VM by another user. While the disclosure herein describes voice-based mails, the disclosure is not so limited and the teachings herein can be used with (e.g., applied to) video-based mails that are accessible to a group of users.

To describe some implementations in greater detail, reference is first made to examples of hardware and software structures used to implement a callback limitations for shared voicemail inbox items.

FIG. 1 is a block diagram of an example of a system 100 that is an electronic computing and communications, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
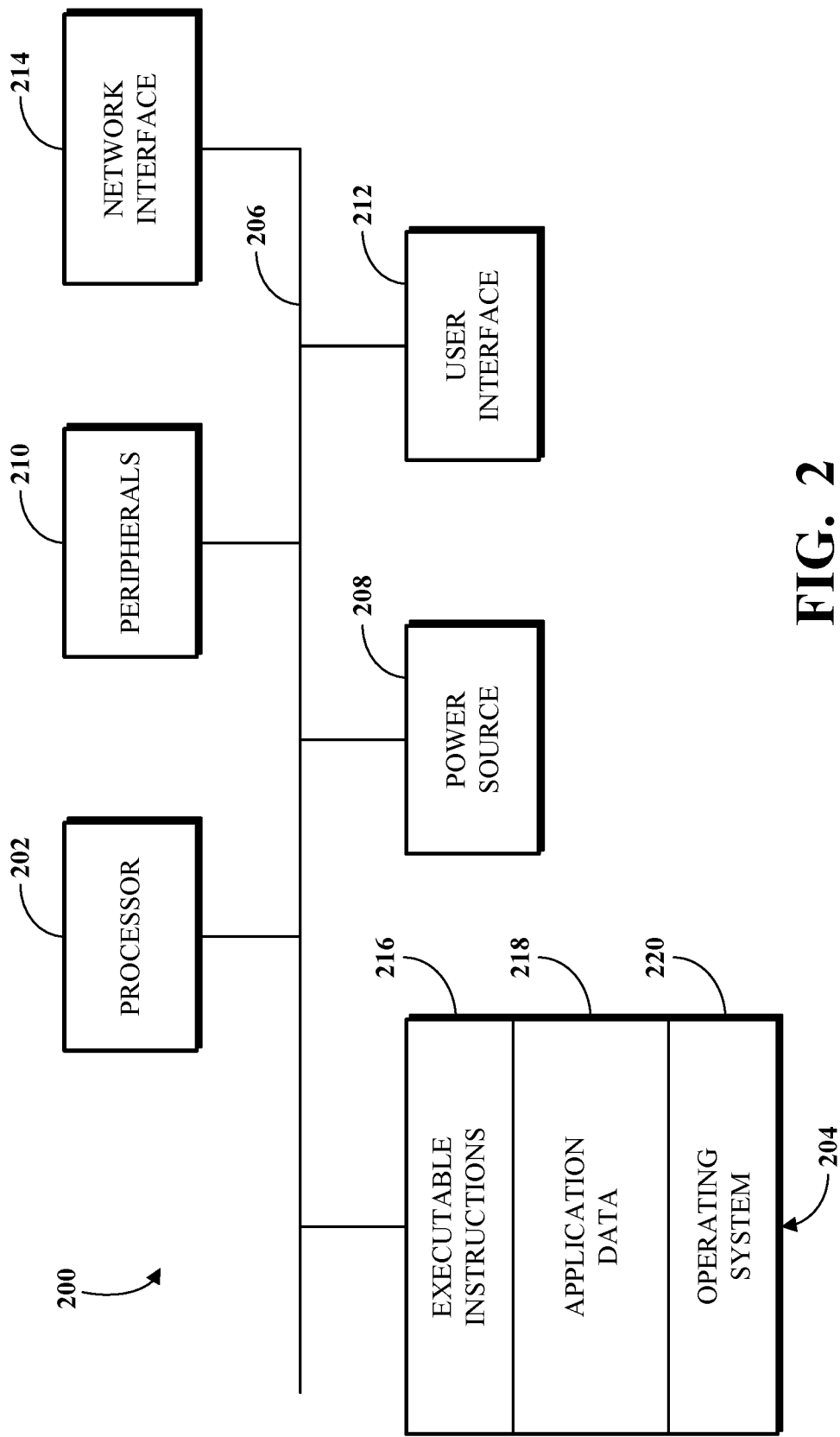
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
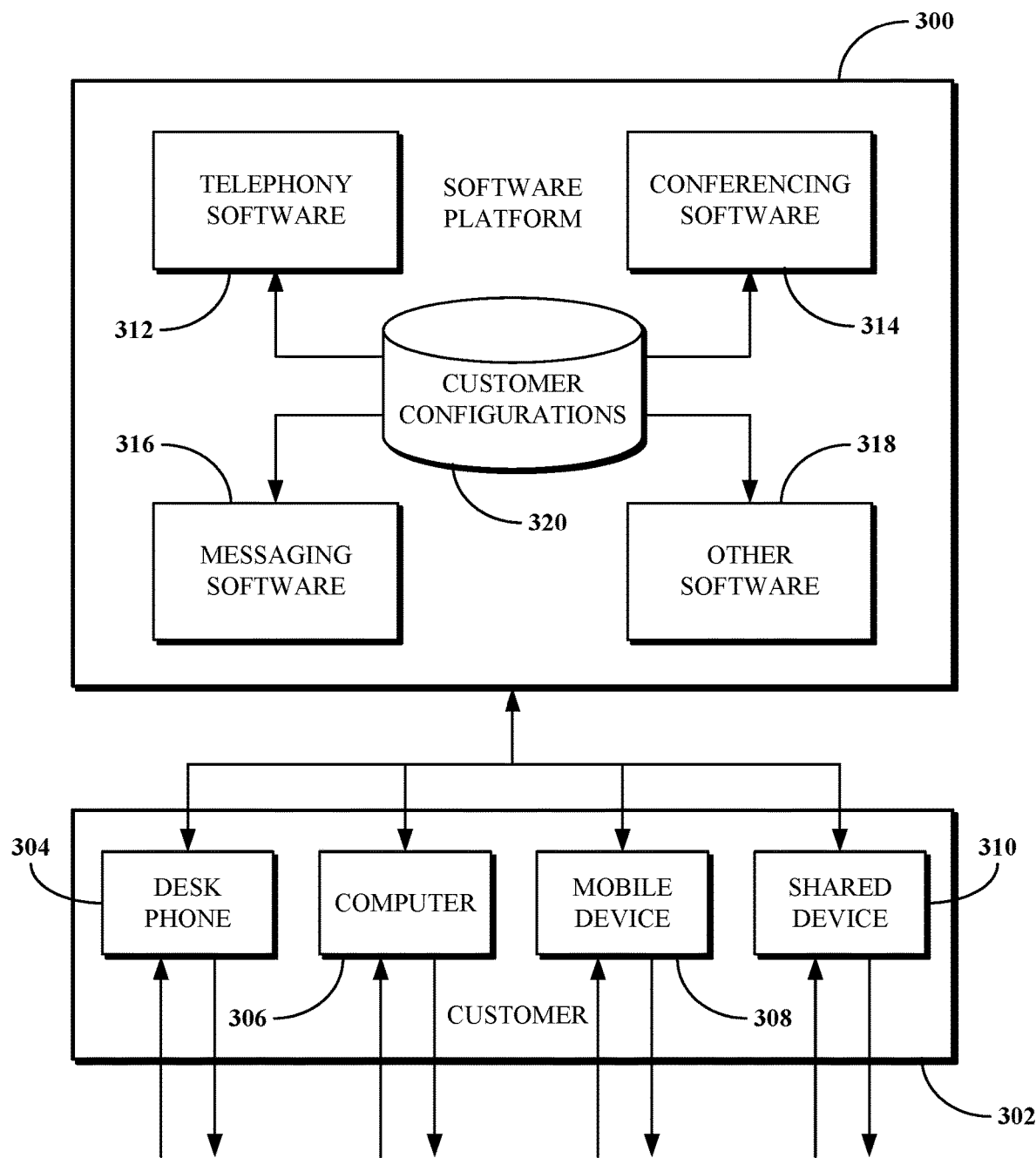
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for providing visibility, automation, collaboration, other services, or a combination thereof with respect to shared VMs that are stored in or associated with shared VM inboxes.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
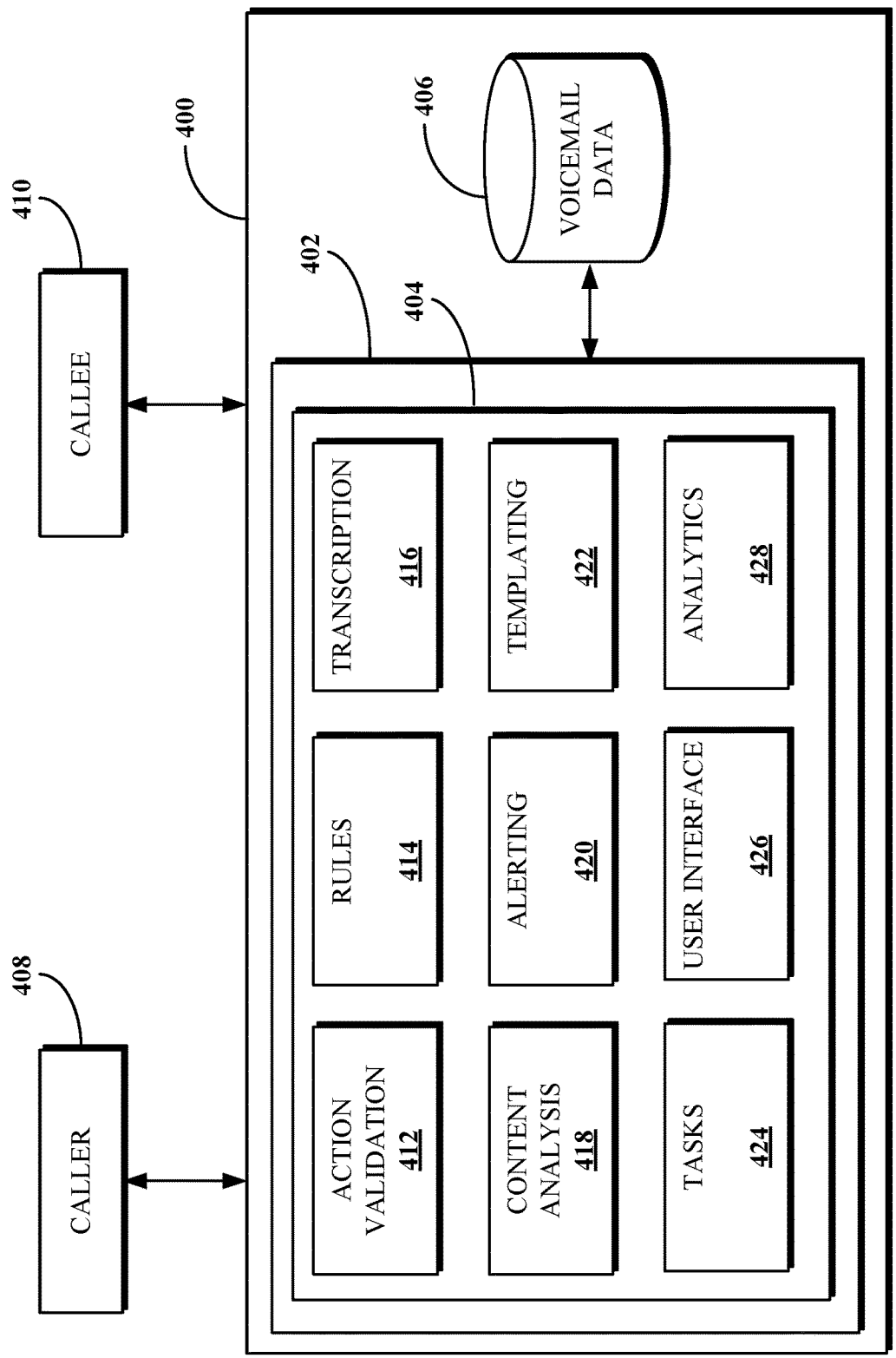
FIG. 4 is a block diagram of an example of a system that provides shared voicemail inboxes.

FIG. 4 is a block diagram of an example of a system that provides shared voicemail inboxes. As shown, a server 400 implements or includes a software platform 402 and a data store 406. The server 400 can be implemented by or included in a datacenter, such as the datacenter 106 of FIG. 1. The software platform 402 provides shared VM inbox services (e.g., capabilities or functionality) via a VM software 404. The software platform 402 can be or can be part of the software platform 300 of FIG. 3. The VM software 404 can be variously implemented in connection with the software platform 402. For example, the VM software 404 can be included in or can work in conjunction with one or more of the telephony software 312, the messaging software 316, or the other software 318 of FIG. 3. For example, in an implementation, the VM software 404 may be or may be integrated within the telephony software 312. The data store 406 can store data related to shared VMs, such as a VM that is stored in or associated with a shared VM inbox that is associated with or is accessible by a group of users. The data store 406 can be included in or implemented by a database server, such as the database server 110 of FIG. 1.

A caller device 408 can be used by a caller and via a telephony software of the software platform 402 to leave (e.g., cause to be saved) a shared VM in a shared VM inbox of a group of users. The shared VM inbox may be enabled by (e.g., set up in, available in, configured using) the VM software 404. The caller device can be or can include a telephone device, a softphone, or some other device, software, or mechanism that enables the caller device 408 to dial a phone number associated with the shared VM. The VM software 404 associates, such as in the data store 406, a telephone number of the caller device 408 with the shared VM.

A callee device 410 can be a device of a user of the group of users associated with (e.g., enabled to access) the shared VM. The callee device may include an application (not shown) that may be a client application and the callee device 410 may be a client device, such as one of the clients 304 through 310 of FIG. 3. A user of the group of users can use the callee device 410 to interact with the shared VM inbox and shared VMs associated therewith.

The software platform 402 enables the group of users to manage a shared VM and can provide at least one of visibility, automation, collaboration, other services, or a combination thereof with respect to a shared VM. In various implementations, the software platform 402 can include one or more of an action validation tool 412, a rules tool 414, a transcription tool 416, a content analysis tool 418, an alerting tool 420, a templating tool 422, a tasks management tool 424, a user interface (UI) tool 426, an analytics tool 428, other tools, or a combination thereof. In some implementations, some of the tools 412 through 428 may be combined. In some implementations, at least one of the tools 412 through 428 may be split into two or more tools.

The action validation tool 412 determines what actions are available to, or possible by, each user of the group of users given a current status of a shared VM. For example, a responsibility status may be associated with the shared VM and actions related to claiming or unclaiming the shared VM may be available or unavailable to each of the team members based on the responsibility status. A shared VM may be associated with different responsibility statuses such as: unclaimed, claimed, automatically claimed, responded, other responsibility statuses, or a combination thereof.

A shared VM may initially be associated with the unclaimed responsibility status indicating that the shared VM is not yet claimed by any member of the group. If the shared VM has not been claimed by any member of the group, then a claiming action may be available to each member of the group to claim the VM. In response to receiving a request to assign a responsibility for the VM to a user, the VM software 404 (e.g., the action validation tool 412) may set the responsibility status to the "claimed" responsibility status, or a similar status. In an example, the request may be received from the user. For example, using a telephone device, a softphone, or a graphical user interface of the callee device 410, the user may provide an audible command, press a key combination, or interact with a graphical user interface control, that the VM software 404 interprets as a request to assign responsibility of the shared VM to the user.

By claiming a shared VM, the claiming user indicates to the rest of the group that the claiming user is assuming responsibility for responding to the shared VM. Stated another way, the VM software 404 enables the other team member to determine, for example, that they need not take any action with respect to the shared VM by communicating, via the claimed responsibility status of the shared VM, that the shared VM is claimed by another user. Assuming the responsibility for responding to the shared VM can mean or can include that the user that claimed the shared VM assumes the responsibility for placing a call, emailing, or otherwise communicating via some other modality with the caller who left the shared VM. The user of the group who claims, or is assigned responsibility for responding to, the shared VM is referred to herein as the responsible user.

In some implementations, the VM software 404 may automatically assign the shared VM to a user of the group. For example, the software platform 402 may obtain (such as using the transcription tool 416) a transcript of the shared VM, perform content analysis (such as using the content analysis tool 418) of the transcript, and assign the shared VM to a member of the group based on rules configured using the rules tool 414. In an example, when the shared VM is automatically claimed, the responsibility status may be set to the automatically claimed responsibility status.

In an example, the action validation tool 412 may be configured so that at least certain members of the group may have privileges to assign responsibility for a shared VM to another member of the group. For example, a supervisory member may, after listening to or reading a transcript of the shared VM, assign responsibility to another team member who may be deemed capable of responding to the shared VM.

The action validation tool 412 enables (e.g., makes available), with respect to a shared VM, a response action for the member assigned the responsibility to respond to the VM. The action validation tool 412 can update the responsibility status associated with the VM based on an indication that the user performed the response action. For example, the responsibility status may be set to the responded status based on the software platform 402 determining that the response action has been performed. The indication that the first user performed the response action can include one or more of transmitting a message, transmitting an email, initiating a telephone call, initiating a video call, or any other mechanism for communicating with the caller, as further described below, in response to the shared VM.

In an example, the action validation tool 412 disables the response action for every other member of the group. That is, if a shared VM, which is already claimed, is not claimed by (or assigned to) a member of the group, then the action validation tool 412 does not make available the response action to the member.

In an example, the action validation tool 412 may be configured to enable the response action to one or more members even though none of the one or more members are assigned responsibility for the shared VM. In an example, the response action enables communication to be initiated by the responsible user and transmitted to the caller via the VM software 404. As such, the response action can be or can include a callback action. The callback action, when invoked (e.g., performed or initiated) by a user causes the VM software 404 (or a tool therein) to place a telephone call (such as via telephony services of the software platform 402) to the caller telephone number.

In an example, the action validation tool 412 can determine whether a claiming action is available to a user based on an availability of the user. For example, the action validation tool 412 can identify whether the user is currently occupied and, if the user is currently occupied, then an action to claim the shared VM would not be available to the user. To illustrate, the user can be identified as occupied if the user is in a meeting or is on a telephone call. In an example, the availability of the user can be determined, such as using presence detection, and based on at least one of a velocity or an altitude identified for the user (such as in the case where the user may be driving or is on a flight). If a user is driving or is on a flight, then the user can be deemed unavailable. In another example, if the user is not available for at least a minimal period of time (e.g., 2 hours, 3 hours) within a given response time (discussed below), then the action to claim the shared VM would not be available to the user. In an example, the availability of the user can be determined by examining a calendar of the user.

In an example, the response action can be or can include a messaging action that enables the responsible user to transmit messages (e.g., a text message, an email message, or a short message service (SMS)) to the caller telephone number. In an example of transmitting an email message, the caller telephone number and the carrier of the telephone number can be used to formulate an email address to transmit the message to. To illustrate, the email address can be of the form 10-digit-phone-number@carrierdomain.com, where examples of carrierdomain include txt.att.net, messaging.nextel.com, and vtext.com, depending on the carrier of the caller telephone number.

In an example, the response action can be or can include an email action. For example, contact information, including an email address, may be associated with the caller telephone number in the data store 406 and/or the customer configurations 320 of FIG. 3. As such, the responsible user can use the response action to cause an email to be transmitted via the software platform 402 to the email address. For example, the software platform 402 may provide facilities that the responsible user can use to compose and send the email.

The rules tool 414 can be used to configure zero or more automatic assignment rules, escalation rules, other types of rules, or a combination thereof. In an example, the rules tool 414 can assign shared VMs to the users of the group on a round robin basis. In an example, a shared VM can be assigned based on a sentiment of (e.g., identified for or associated with) the shared VM. For example, shared VMs associated with negative sentiments may be assigned to experienced users and/or supervisory users; shared VMs associated with positive sentiments may be assigned to junior team members; and shared VMs associated with neutral or unknown (i.e., undetermined) sentiments may be assigned on a round-robin basis.

In an example, a shared VM can be assigned based on location-based rules. For example, a geographical area (e.g., a time zone, a state, a city, or a locality) associated with the caller telephone number can be identified and one of the users closest (e.g., in the same time zone or in the same state) to the geographical area can be assigned to the shared VM. Each user of the group can be associated with data that can be used to determine a location for the user. For example, at least one of an address, a telephone number, a time zone, a territory, other data, or a combination thereof associated with a user can be used to determine (e.g., identify or obtain) a location for the user.

In another example, the response time can be based on information associated with the caller. To illustrate, information associated with the caller, such as in the data store 406 or some other data store, can be used to categorize the caller into one of high priority customer, medium priority customer, and normal priority customer. A respective response time can be associated with each category. In an example, the information associated with the caller can be or include a monetary value identified for the caller, such a volume of purchases by the caller in a period of time or an expected sales volume based on the shared VM or other recent communications with the caller.

The rules tool 414 can be used to configure response timing rules and escalation rules. For example, a shared VM inbox may be associated with a configuration such that a shared VM left in the shared VM inbox is to be responded to within a given response time (e.g., 24 hours). Escalation rules can also be configured such that, if a shared VM is not responded to (i.e., the responsibility status is not set to the responded status) within the given response time, then the shared VM is reassigned to another user (e.g., a supervisor) and a second, shorter response time is set. In an example, the response time can be set based on the sentiment of the shared VM. To illustrate, a first response time (e.g., 3 hours) may be configured for shared VMs associated with very negative sentiments; a second response time (e.g., 8 hours) may be configured for shared VMs associated with negative sentiments; and a third response time (e.g., 24 hours) may be configured for shared VMs associated with other sentiments.

The transcription tool 416 can be used to generate (e.g., obtain) transcripts of VMs. In an example, the transcription tool 416 may use a service (e.g., a cloud-based service) to obtain transcripts. The transcription tool 416 can associate a transcript with a shared VM in the data store 406. In an example, and as already mentioned, a content analysis result of a shared VM can be used to automatically assign a shared VM to a user of the group. For example, each user can be associated (such as in the data store 406, or some other data store) with respective keywords, skill descriptions, job descriptions, and tags (collectively, capabilities). The rules tool 414 can match member capabilities to the content analysis result to identify a member to automatically assign responsibility of the shared VM to and the rules tool 414 can set the responsibility status of the shared VM to the automatically claimed status.

The content analysis tool 418 associates, such as in the data store 406, a content analysis result with a shared VM. In an example, the content analysis result can be used, such as by the rules tool 414, to automatically assign the shared VM to one of the team members.

The content analysis tool 418 can analyze the transcript of a shared VM to identify the presence of certain words in and/or identify themes or concepts associated with the transcript. The content analysis tool 418 can include such identified words, themes, and/or concepts in the content analysis result. Any number of known tools, techniques, or services can be, or can be used by, the content analysis tool 418. In an example, the content analysis tool 418 can identify a sentiment (e.g., positive, negative, neutral, angry, or irate) associated with the shared VM. The sentiment can be identified based on an analysis of at least one of the transcript or the audio recording of the shared VM (such as by analyzing the tone used). The content analysis tool 418 can also include the identified sentiment in the content analysis result.

The alerting tool 420 provides notifications to the responsible user. For example, the alerting tool 420 may determine that the responsible user is attempting to perform a response action (e.g., initiating a phone call) at a time that the caller may not receive the phone call. The alerting tool 420 may display a notification describing a reason why it is not advisable to perform the response action at the time that the responsible user is attempting to perform the response action. For example, the alerting tool 420 may obtain phone information associated with the caller phone number from a phone information source. The phone information source can be the data store 406. The phone information source can be a reverse phone number lookup service, which can be used to obtain information about the phone number of the caller device 408, such as a name and an address of the holder of the phone number and the type of line. In an example, a business and hours of operations of the business may be obtained, such as by performing an internet search, interrogating a website of the business, or some other way of obtaining the hours of operations.

To illustrate, at 4:30 PM Pacific Standard Time, the responsible user may initiate, such as from a user interface provided by the software platform 402 (such as the user interface described with respect to FIG. 5), a telephone call to the caller telephone number; the alerting tool 420 determines that the caller telephone number is in the Eastern Time Zone, and as such, the time at the recipient side is 7:30 PM; and notifies the responsible user that the recipient may not be available at such a time (such as because this time is outside of the hours of operations of the recipient or is an inconvenient time). The alerting tool 420 may display or cause to be displayed, in notification dialog boxes to the responsible user, options including one or more of a first option to cancel the performance of the response action or a second option to proceed with the performance of the response action.

In an example, the alerting tool 420 can also provide reminders to the responsible user. In an example, the dialog box described above can also include a third option, and/or some scheduling action may be available to the responsible user, enabling the responsible user to schedule a reminder for a later time, that the responsible user provides, to perform the response action. The alerting tool 420 may cause a pop up reminder to be displayed and/or a notification (e.g., a text message) to be transmitted to the responsible user at or before the later time to remind the responsible user to perform the response action. In another example, the alerting tool 420 may cause a reminder to be added to a calendar of the responsible user.

The templating tool 422 can be used to configure response templates. The response templates can be stored in the data store 406 or some other data store. The response templates can be standardized responses that the responsible user should use. A configured response template can include one or more conditions and one or more suggested responses. The one or more conditions can include keywords, themes, subjects, and/or concepts and the suggested response can include one or more suggested sentences that the responsible user should use. Some of the suggested sentences can be parametrized sentences. The templating tool 422 can match the content analysis result against the one or more conditions of the configured response templates to obtain (e.g., select, identify, suggest, or fill in) the one or more suggested sentences.

To illustrate, a first configured response template can essentially state "if the content of the shared VM includes <synomym:forgot> and <keyword:password>, then say 'click forgot password on your home page.';" a second configured response template can essentially state "if <sentiment:angry>, then say 'I am sorry you had a negative experience';" a third configured response can essentially state "if <match:%concept%>, then say 'You called about %concept%." Other configured response templates, syntaxes, and semantics are possible. In the first configured response template, which may be left in the shared VM inbox of a technical support group, if the shared VM includes a synonym of the word "forgot" (e.g., lost) and includes the word "password," then the responsible user may be prompted to say "click forgot password on you home page." In the second configured response template, which may be left in the shared VM inbox of a customer service group, if the sentiment of the shared VM is identified as "angry," then the responsible user may be prompted to show empathy by saying "I am sorry you had a negative experience." In the third configured response template, the responsible user may be prompted to state the reason for the call by repeating the concept included in the content analysis result.

The tasks management tool 424 can be used to create and associate a set of tasks with a shared VM. The set of tasks can be, or can be thought of, as a project plan for responding to the shared VM. Different tasks of the set of tasks may be assigned to different members. The set of tasks can include task dependencies. One of the tasks of the set of tasks may be designated as a response action. As such, when the designated task is marked as completed, the responsibility status of the shared VM can be set to the responded status.

The UI tool 426 can be used to generate user interfaces with which a user of the group can interact to obtain information regarding shared VM inboxes the user is authorized to access, shared VMs in the shared VM inboxes, and/or perform actions with respect to the shared VM inboxes and/or the shared VMs. The UI tool 426 can use one of the tools of the VM software 404 or the software platform 402 to obtain the information and/or cause the actions to be performed.

The UI tool 426 can generate user interfaces in different modalities. The modality can depend on the type of callee device 410 or the mechanism via which the callee device 410 connects to or requests the services of the software platform 402. For example, the callee device 410 may connect to the software platform 402 using a telephony connection. As such, the generated user interface may be an interactive voice response (IVR) interface via which a member may claim (via voice commands or key presses) a shared VM and, if the shared VM is claimed by the member, allows the member to return the call (e.g., perform the response action). In another example, a user may access the VM software 404 using a voicemail application or a web browser and the UI tool 426 may generate a rich graphical user interface, such as described with respect to FIG. 5.

The analytics tool 428 can be used to provide (e.g., generate) reports regarding the performance of groups of users and the shared VM inboxes assigned to them. In an example, the analytics tool 428 or results therefrom can be used (such as by the rules tool 414) to automatically assign shared VMs to team members. For example, the analytics tool 428 can use content analysis results of shared VMs and historical shared VM claiming data to identify patterns of claiming or assignment of shared VMs to users. To illustrate, the analytics tool 428 may determine that 70% (or some other threshold) of shared VMs pertaining to interest in Ford Broncos have been claimed by the user Anton Karenina. As such, the rules tool 414 can add a rule that essentially indicates "if <theme:interest> <product:Ford Bronco>, then <assign:Anton Karenina>."

Figure 5:
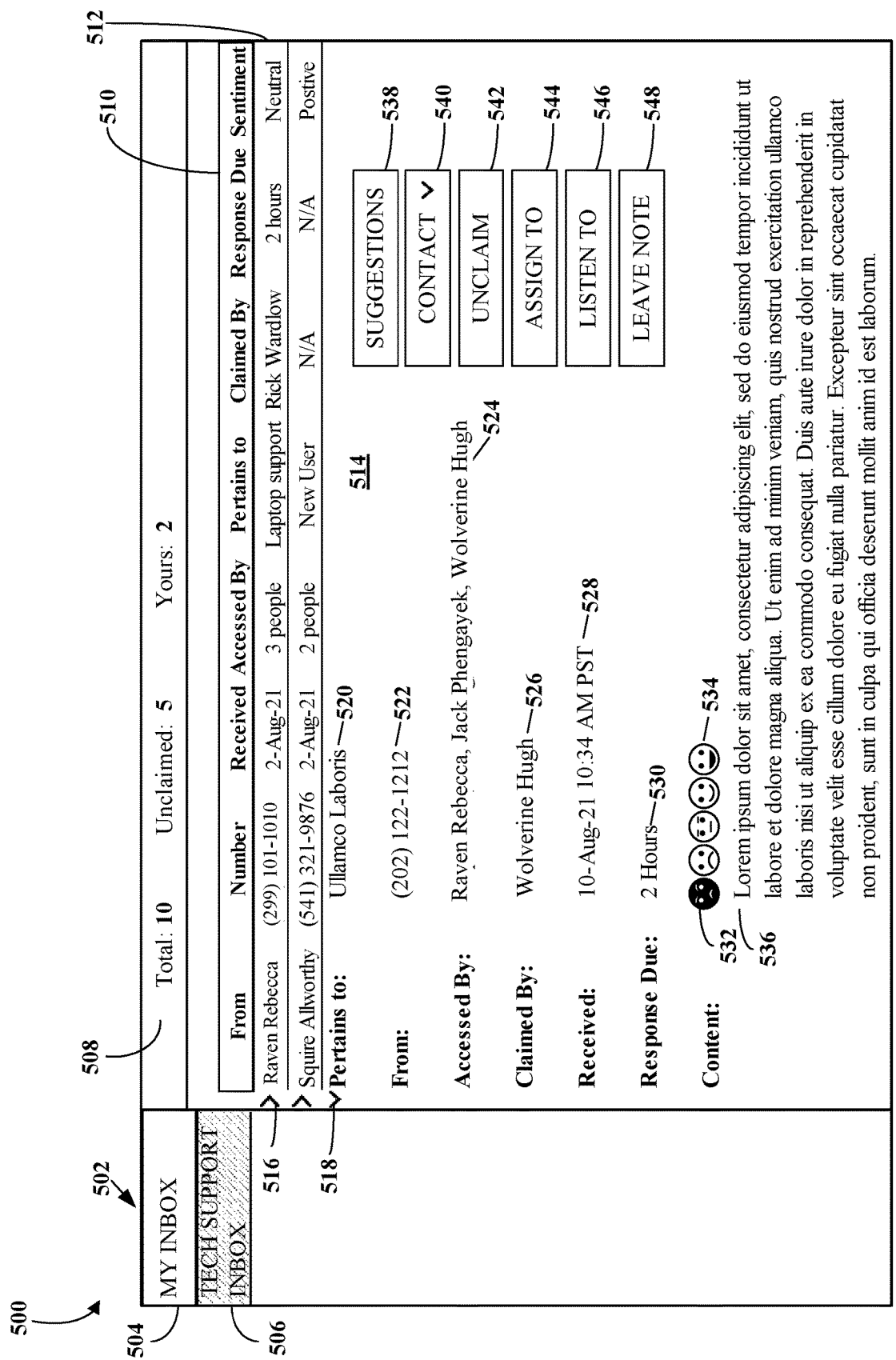
FIG. 5 is an example of a user interface for shared VM inbox.

FIG. 5 is an example of a UI 500 for a shared VM inbox. The UI 500 can be, at least partially, generated by the UI tool 426 of FIG. 4. The UI 500 is but an illustrative UI and the disclosure herein is not in any way limited by the information, actions, or UI controls displayed in the UI 500, or the arrangement of such information, actions, or controls. Other information, actions, controls, and arrangements are possible.

A current user of a group of users can access (such as using an application or a web browser) the software platform 402 to obtain the UI 500. As shown, the current user is named "Wolverine Hugh," which can be inferred based on the fact that a contact action 540 is available and the claiming user is "Wolverine Hugh" (see a field 526), which are further described below. A list 502 lists all the voicemail inboxes that the user has access to. The UI 500 shows that the user has access to a personal VM box 504 and a shared VM inbox 506. The UI 500 illustrates (via a fill pattern) that the user has selected the shared VM inbox 506 to display information regarding shared VMs in the shared VM inbox 506.

A header 508 displays summary information regarding the shared VMs in the shared VM inbox 506. The header 508 indicates that the shared VM inbox 506 includes a total of 10 shared VMs, that 5 of the 10 shared VMs are currently unclaimed, and that 2 of the 10 shared VMs are claimed by (or automatically assigned to) the current user. A table 510 displays a respective row (such as a row 512) for each of the shared VMs in the shared VM inbox 506. The UI 500 shows only the first three of the 10 shared VMs of the shared VM inbox 506. As can be appreciated, the table 510 may include facilities (not shown) for filtering, sorting, and searching.

The row 512 illustrates that the respective shared VM is received on Aug. 2, 2021, from the caller telephone number "(299) 101-1010," for which a caller ID (i.e., "Raven Rebecca") is identified; that the shared VM has been accessed by 3 team members; that the content analysis result includes that the shared VM pertains to "Laptop Support" and that the sentiment of the shared VM is "Neutral;" and that a response to the shared VM is due in 2 hours. That a shared VM has been accessed by a user can mean that the user listened to the VM, that the user viewed the detailed information of the shared VM (such as described with respect to detailed information 514), or that the user received an email that includes a transcript of the shared VM and the user indicated that the user has read the email. In an example, the VM software 404 may transmit or cause to be transmitted, to the user, information about the shared VM, including the transcript, where the email is configured so that a read-receipt response is transmitted from the email application of the user to the VM software 404 when the user confirms that the user has read the email.

UI controls can be used to expand a row (to display detailed information) or collapse a detailed information (to display less information) about a shared VM. The user can use an expander 516 to display detailed information and can use a collapser 518 to show less information. The detailed information 514 illustrates information and actions of a third row of the table 510. The shared VM of the detailed information 514 pertains to the topic or theme "Ullamco Laboris" (as indicated by a field 520); that the shared VM was received from the caller telephone number indicated by a field 522; that the three users Raven Rebecca, Jack Phengayek, and Wolverine Hugh, shown in a field 524, have accessed the shared VM; that the user Wolverine Hugh (i.e., the current user) has assumed responsibility for responding to the shared VM, as indicated by a field 526; that the shared VM was left in the shared VM inbox on the date indicated by the field 528; that, given the rules configured for the shared VM inbox 506, a response is due in 2 hours (as indicated by a field 530). A sentiment (a dark icon 532) indicates, in a sentiment meter 534, the sentiment associated with the shared VM. A field 536 shows the transcript of the shared VM.

A set of actions can be available to the user to perform on the shared VM. The set of actions available to the user can depend on a current status of the shared VM (e.g., whether the shared VM is already claimed or not), on the user role (e.g., whether the user is the claiming user, is not the claiming user, or is a supervising user), other criteria, or a combination thereof.

A suggestions action 538, when invoked by the user, can cause the UI tool 426 of FIG. 4 to obtain, from the templating tool 422 of FIG. 4, and display a list of suggested responses. In an example, the suggestions action 538 may be available only to the claiming user. A contact action 540, allows the user to initiate contact with the caller of the shared VM. The contact action 540 can enable the user to select a contact modality (e.g., placing a phone call to the caller telephone number of the field 522, placing a video call, sending an email, or sending a text message). The contact action 540 is available only to the user claiming user. In some examples, the contact action 540 can also be available to a supervising user. In an example, in response to the user invoking the contact action 540, the VM software 404 can place a telephone call to the caller telephone number. The VM software 404 can detect that the telephone call has ended and set the responsibility status of the shared VM to the responded status.

An unclaim action 542 allows the current user, who has claimed the shared VM or who was automatically assigned the shared VM, to unclaim the shared VM. In response to receiving the request to unclaim the shared VM, the VM software 404 can set the responsibility status of the shared VM to the unclaimed status. In an example, the VM software 404 can transmit to at least some of the users of the group indicating that the shared VM, which was assigned to the current user, is now unclaimed. If the shared VM is unclaimed, the set of actions can include an action (not shown) that the current user can invoke to claim the shared VM. If the shared VM were not already claimed, then the UI 500 would include a claim action, which, when performed by the current user, causes the VM software 404 to assign responsibility of the shared VM to the current user and changes the responsibility status of the shared VM to the claimed status.

An assign action 544 may be available to at least some users. In an example, the assign action 544 may be available to supervising users. A supervising user can use the assign action 544 to assign responsibility of the shared VM to another user. By invoking an action 546, the shared VM can be played to the current user. An action 548 allows the user to enter notes related to the shared VM. In an example, the current user can use the action 548 to enter a summary of the phone call with the caller that left the shared VM. In an example, the current user may leave any notes that may be helpful to the assigned user in responding to the shared VM. In an example, any notes associated with the shared VM can be displayed in the detailed information 514.

In an example, a delete action (not shown) may be available for a shared VM. The delete action may be available only if the responsibility status of the shared VM is the resolved status. When the delete action is invoked, the shared VM and any information related to the VM can be permanently deleted from the data store 406. In an example, an archive action (not shown) may be available for a shared VM. The archive action may be available only if the shared VM is in the resolved status. When the archive action is invoked, the shared VM and any information related to the shared VM are retained in the data store 406; however, the shared VM will no longer be displayed in shared VM inbox listings, such as the table 510. The shared VM may be unarchived by an administrative, or other so privileged, users.

To further describe some implementations in greater detail, reference is next made to examples of techniques which may be performed by or using a callback limitations for shared voicemail inbox items.

Figure 6:
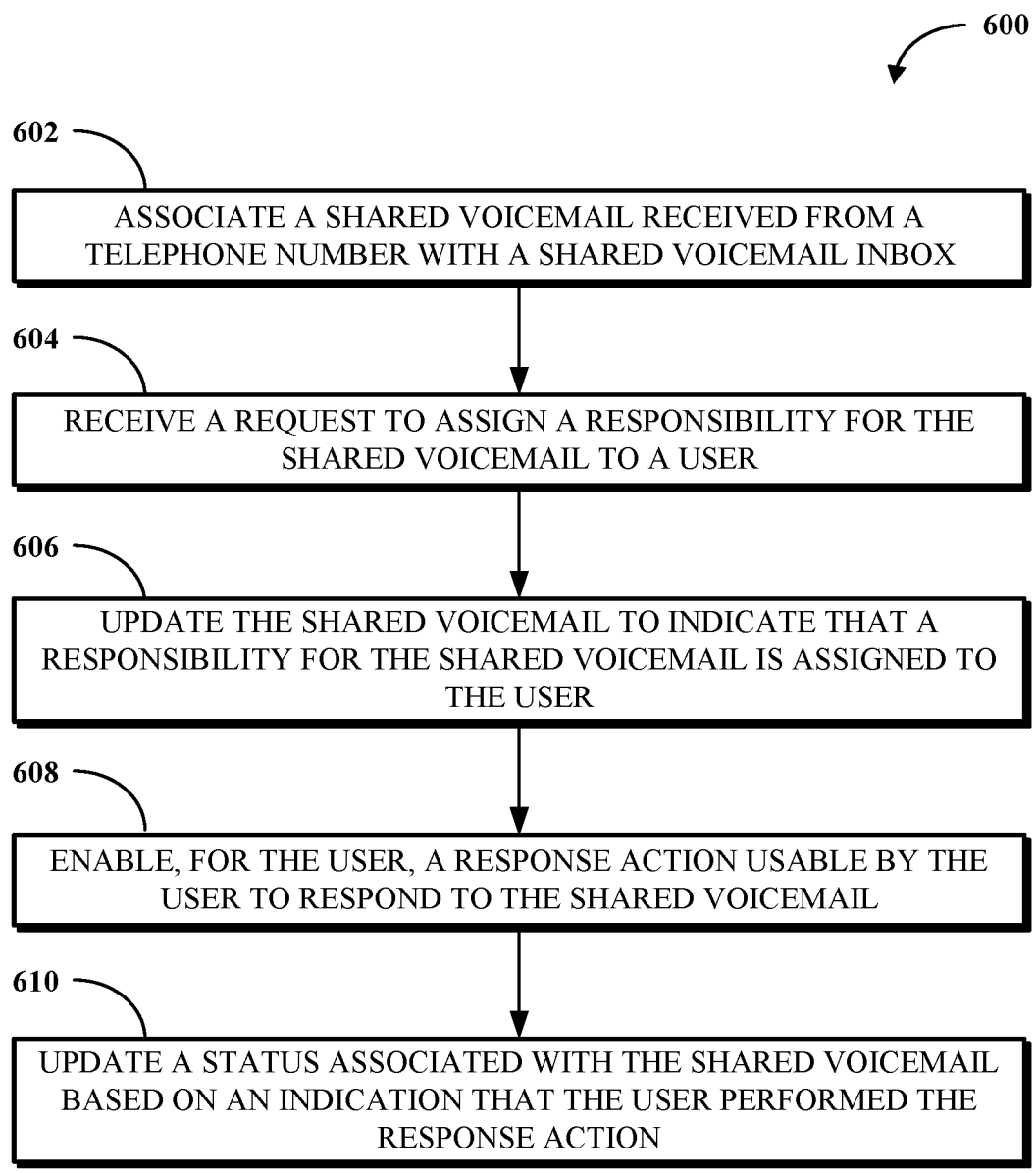
FIG. 6 is a flowchart of an example of a technique for enabling response actions with respect to shared VMs.

FIG. 6 is a flowchart of an example of a technique 600 for enabling response actions with respect to shared VMs. The technique 600 can be executed using computing devices, such as the systems, hardware, and software described with respect to FIGS. 1-5. The technique 600 can be performed, for example, by executing a machine-readable program or other computer-executable instructions, such as routines, instructions, programs, or other code that may be stored in a memory (i.e., a non-transitory computer-readable storage medium). The steps, or operations, of the technique 600 or another technique, method, process, or algorithm described in connection with the implementations disclosed herein can be implemented directly in hardware, firmware, software executed by hardware, circuitry, or a combination thereof.

For simplicity of explanation, the technique 600 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 602, a first VM received from a first telephone number (i.e., a caller telephone number) is associated with a shared VM inbox. The shared VM inbox is accessible to a group of users that includes a first user. As mentioned above, the shared VM may be video-based mail and the caller telephone number may be more generally referred to as a caller end point (such as a video end point).

At 604, a request to assign a responsibility for the first shared VM to the first user is received. In an example, the request can be received from the first user. For example, and as described above, the first user can invoke an action that may be available through a user interface such that invoking the action causes responsibility for the first shared VM to be assigned to the first user. In another example, the request can be received based on an automatic assignment of the first shared VM to the first user, as described at least with respect to the rules tool 414 of FIG. 4. As described above, the first shared VM can be automatically assigned to the first user based on an analysis of the content of the first shared VM, based on escalation rules, based on a location of the first user, based on a sentiment identified for the first shared VM, based on analysis of historical claiming of shared VMs, other criteria, or a combination thereof.

At 606, the first shared VM is updated to indicate that the responsibility for the first shared VM is assigned to the first user. For example, an association in a data store, such as the data store 406 of FIG. 4, may be created as indicating that responsibility for the first shared VM is assigned to the first user. A responsibility status associated with the first shared VM may also be updated to indicate that the first shared VM has the claimed status.

At 608, a response action usable by the first user to respond to the first shared VM is enabled for the first user and with respect to the first shared VM. In an example, the response action can be an action that the first user can use to initiate contact with a caller that used the first telephone number to leave the first shared VM. In an example, the response action can be a callback action that the first user can use to initiate a telephone call to the first telephone number. Other response actions are possible. In an example, the response action is available only to the user that claimed or is assigned responsibility for the first shared VM. As such, the response action may be disabled for a second user of the group of users and with respect to the first shared VM such that the second user is not able to perform the response action.

At 610, the responsibility status associated with the first shared VM is updated based on an indication that the first user performed the response action. For example, and as described above, a determination can be made that a telephone call has ended and the responsibility status of the first shared VM can accordingly be set to the responded status.

In an example, the technique 600 can also include associating a second shared VM with the shared VM inbox. In an example, the technique 600 can further include identifying a sentiment associated with the second shared VM and assigning a responsibility for the second shared VM to a second user of the group of users based on the sentiment. In an example, the technique 600 can further include obtaining, using speech to text conversion, content of the second shared VM; and assigning a responsibility for the second shared VM to a second user of the group of users based on the content of the second shared VM. In an example, the second shared VM can be received from a second telephone number and the technique 600 can further include identifying a second user of the group of users based on the second telephone number and assigning a responsibility of the second shared VM to the second user.

In an example, the response action is a callback action, and the technique 600 can further include receiving, from the first user, a request to perform the response action at a current time, notifying the first user to perform the callback action at another time (i.e., a time that is different from the current time) based on a condition, receiving a request from the first user to be notified to perform the callback action at a specified time, and transmitting a notification to the first user to perform the callback action at the specified time. In an example, the condition can be based on a first time zone associated with the first telephone number and a second time zone associated with the first user. In an example, the condition can be based on determining that a recipient of the response action is not available.

Figure 7:
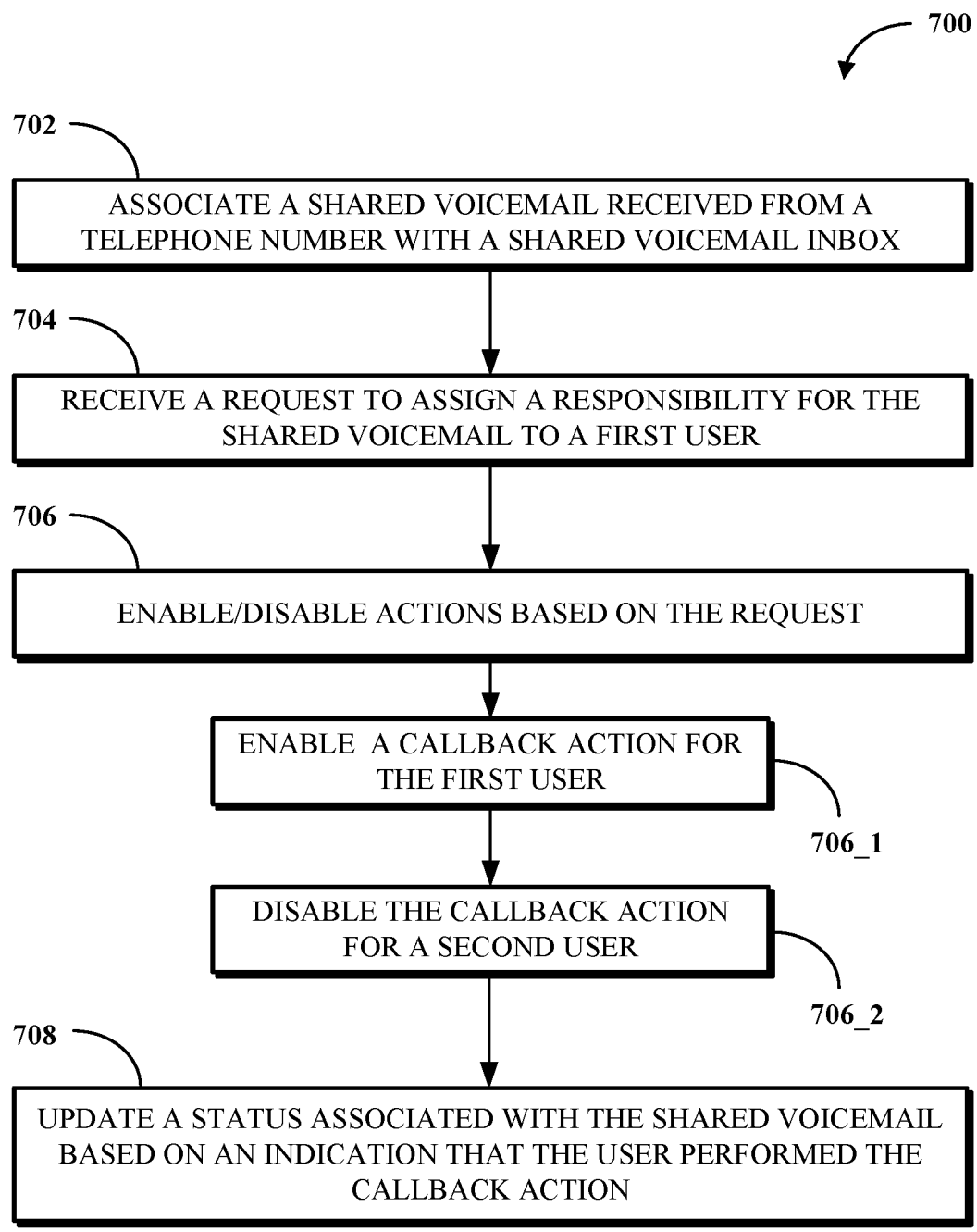
FIG. 7 is a flowchart of an example of a technique for enabling and disabling response actions with respect to shared VMs.

FIG. 7 is a flowchart of an example of a technique 700 for enabling and disabling response actions with respect to shared VMs. The technique 700 can be executed using computing devices, such as the systems, hardware, and software described with respect to FIGS. 1-5. The technique 700 can be performed, for example, by executing a machine-readable program or other computer-executable instructions, such as routines, instructions, programs, or other code that may be stored in a memory (i.e., a non-transitory computer-readable storage medium). The steps, or operations, of the technique 700 or another technique, method, process, or algorithm described in connection with the implementations disclosed herein can be implemented directly in hardware, firmware, software executed by hardware, circuitry, or a combination thereof.

At 702, a shared VM received from a telephone number is associates with a shared VM inbox that is accessible to a group of users including a first user and a second user. At 704, a request is received to assign a responsibility for the shared VM to the first user. At 706, based on the request, actions are enabled and disabled for the different users of the group. Enabling and disabling actions includes, at 706_1, enabling for the first user and with respect to the shared VM, a callback action usable to initiate a call to the telephone number; and, at 706_2, disabling, for the second user and with respect to the shared VM, the callback action. At 708, based on an indication that the first user performed the callback action, a status (i.e., a responsibility status) associated with the shared VM is updated.

In an example, and as further described above, a second shared VM is associated with the shared VM inbox, a content analysis result is associated with the second shared VM, and a responsibility for the second shared VM is assigned to the second user of the group of users based on the content analysis result. In another example, and as further described above, a request to perform the callback action at a current time is received the first user; the first user is notified to perform the callback action at another time (i.e., a time that is different from the current time) based on a condition; a request is received from the first user to be notified to perform the callback action at a specified time; and a notification is transmitted to the first user to perform the callback action at the specified time. The condition can be based on determining that a recipient of the callback action is not available.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
associating a voice message (VM) received from a phone number with a shared VM inbox that is accessible to a group of users including a first user and a second user;
assigning the VM to the first user, wherein assigning the VM to the first user includes enabling a callback action for the first user;
determining that the first user did not respond to the VM within a predefined response time;
responsive to determining that the first user did not respond to the VM within the predefined response time:
reassigning the VM to the second user,
enabling for the second user the callback action associated with the VM, and
disabling for the first user the callback action; and
updating a status associated with the VM based on performance of the callback action.

2. The method of claim 1, wherein the callback action is used to initiate a call to the phone number.

3. The method of claim 1, further comprising:
identifying the second user based on an escalation rule.

4. The method of claim 1, wherein the VM is assigned to the first user based on an identified sentiment of the VM.

5. The method of claim 1, wherein the VM is assigned to the first user based on content of the VM that is obtained using speech to text conversion.

6. The method of claim 1, wherein the VM is assigned to the first user based on a determined time zone for the phone number.

7. The method of claim 1, further comprising:
preventing a third user from performing the callback action responsive to determining that the VM is assigned to the second user.

8. A device, comprising:
a memory; and
a processor, the processor configured to execute instructions stored in the memory to:
associate a voice message (VM) received from a phone number with a shared VM inbox that is accessible to a group of users including a first user and a second user;
assign the VM to the first user, wherein assigning the VM to the first user includes enabling a callback action for the first user;
determine that the first user did not respond to the VM within a predefined response time;
responsive to determining that the first user did not respond to the VM within the predefined response time:
reassign the VM to the second user,
enable for the second user the callback action associated with the VM, and
disable for the first user the callback action; and
update a status associated with the VM based on performance of the callback action.

9. The device of claim 8, wherein the callback action is used to initiate a call to the phone number.

10. The device of claim 8, wherein the processor is further configured to execute instructions stored in the memory to:
identify the second user to reassign the VM to based on an escalation rule.

11. The device of claim 8, wherein the VM is assigned to the first user based on an identified sentiment of the VM.

12. The device of claim 8, wherein the VM is assigned to the first user based on content of the VM that is obtained using speech to text conversion.

13. The device of claim 8, wherein the VM is assigned to the first user based on a determined time zone for the phone number.

14. The device of claim 8, wherein the processor is further configured to execute instructions stored in the memory to:
prevent a third user from performing the callback action responsive to determining that the VM is assigned to the second user.

15. A non-transitory computer-readable storage medium storing instructions operable to cause one or more processors to perform operations comprising:
associating a voice message (VM) received from a phone number with a shared VM inbox that is accessible to a group of users including a first user and a second user;
assigning the VM to the first user, wherein assigning the VM to the first user includes enabling a callback action for the first user;
determining that the first user did not respond to the VM within a predefined response time;
responsive to determining that the first user did not respond to the VM within the predefined response time:
reassigning the VM to the second user,
enabling for the second user the callback action associated with the VM, and
disabling for the first user the callback action; and
updating a status associated with the VM based on performance of the callback action.

16. The non-transitory computer-readable storage medium of claim 15, wherein the callback action is used to initiate a call to the phone number.

17. The non-transitory computer-readable storage medium of claim 15, wherein the operations further comprise:
identifying the second user to reassign the VM to based on an escalation rule.

18. The non-transitory computer-readable storage medium of claim 15, wherein the VM is assigned to the first user based on an identified sentiment of the VM.

19. The non-transitory computer-readable storage medium of claim 15, wherein the VM is assigned to the first user based on content of the VM that is obtained using speech to text conversion.

20. The non-transitory computer-readable storage medium of claim 15, wherein the VM is assigned to the first user based on a determined time zone for the phone number.

* * * * *